UNITED STATES PATENT OFFICE 2,099,685

AROMATIC OXYKETONE ARSENICALS AND A PROCESS OF MAKING THEM

Cliff S. Hamilton, Lincoln, Nebr., assignor to Parke, Davis & Company, Detroit, Mich., a corporation of Michigan No Drawing. Application April 11, 1932, Serial No. 604,658

11 Claims. (Cl. 260—14)

The object of the invention is to obtain new arsenicals particularly useful for therapy, and a process of making them.

The invention deals with a special type of aromatic arsenical which contains a phenoxy group joined through oxygen to another radical containing a ketone group. This type of compound may be represented by the general formula

in which R is an aromatic grouping which may contain substituents such as the amino-, substituted amino, nitro, sulfo-, and halogen groups and R' is an alkyl or aralkyl group containing a ketone group or a substituted ketone group. The arsenic group may be present either in trivalent or pentavalent form as is illustrated in the examples. The simplest member of the series possesses the formula

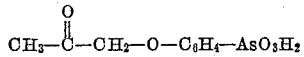

but as the examples show, variations in the mother substance may be introduced by changes in the nature of the oxy-ketone group, in the phenoxy group and in the arsenic group. Moreover, derivatives involving the ketone group can also be prepared and such examples are described. The ketone group permits the preparation of derivatives such as oximes, hydrazones, guanidines, etc., both simple and substituted.

Although arsenical compounds derived from ketones have been described, the particular type disclosed in this invention, and which possess the ketone part of the molecule united to the arsenic-bearing group through an oxygen atom, are new.

The compounds described possess certain advantages over known arsenic compounds used in the treatment of certain trypanosome infections, such as syphilis, in that they are highly active even when administered by the oral route, although one is not limited to such a mode of administration.

The most convenient form for oral administration consists of the use of the arsonic acids which form water-soluble salts such as potassium, ammonium, lithium, calcium, or sodium salts but, naturally, the nature of the inorganic constituents is immaterial. For hypodermic use the arsonic acid salts may be used as such or reduced to the arseno (—As=As—) compounds or to the intermediate arsenoxides (—As=O) and used as such or in the form of derivatives.

The following examples will serve to illustrate the preparation of this special class of arsenical compounds:

*Example 1.—Preparation of p-arsono-phenoxy-acetone*

To 54 gm. of p-hydroxy-phenylarsonic acid, dissolved in 20 gm. of sodium hydroxide and 125 cc. water and cooled to 20°, is added 35 cc. of freshly distilled mono-chloroacetone. The mixture is refluxed 45 minutes, cooled to 10°, made acid by 20 cc., hydrochloric acid (sp. gr. 1.19) and the product allowed to crystallize. Recrystallization gives 6–7 gm. white crystals. M. P. 172–173° C. The analysis of the product shows 27.3 and 27.4% arsenic whereas the amount calculated for the formula

*Example 1A.—Preparation of soluble salts*

The above arsonic acid may be converted into a soluble salt by dissolving it in a small volume of an aqueous solution containing one equivalent of alkali, precipitating it by the addition of an organic precipitant such as acetone and drying it. A sample of the above p-arsono-phenoxy acetone thus treated with sodium hydroxide yielded the corresponding sodium salt consisting of a white, water-soluble product, which upon analysis was found to contain 25.2% arsenic. The theoretical value for the anhydrous sodium salt is 25.3% As.

*Example 2.—Preparation of p-arsono-phenoxy acetophenone*

When ω-chloroacetophenone is substituted for monochloroacetone in Example 1 the resulting product is p-arsono-phenoxy-acetophenone. One mole of sodium p-hydroxy phenyl arsonic acid is dissolved in 400 cc. of 10% aqueous sodium hydroxide solution, one mole of ω-chloroacetophenone is added, and the mixture boiled gently during one hour. The reaction mixture is extracted twice with ether to remove impurities, sufficient water added to dissolve the sodium salt (alkali being added to neutralize the solution if necessary) and the solution filtered.

The free acid is precipitated by the addition of 10% hydrochloric acid and is recrystallized twice from 85% alcohol. It is thus obtained in transparent needles which melt at 250° C. (uncorr.). It is soluble in alkali carbonates as well as in caustic alkali. When boiled with hypophosphorous acid the solution becomes turbid and the yellow arseno derivative precipitates.

Analysis of p-arsono-phenoxy acetophenone gave 22.2% and 22.5% arsenic, respectively, whereas the formula $$C_6H_5CO-CH_2-O-C_6H_4-AsO_3H_2$$

requires 22.3% arsenic.

*Example 3.—Preparation of 2-nitro-4-arsono-phenoxyacetone*

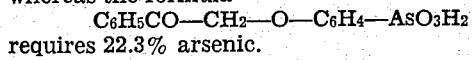

To forty-five cc. of concentrated sulfuric acid thoroughly cooled in a salt and ice mixture there is added slowly 16.5 grams of p-arsono-phenoxy-acetone with vigorous mechanical stirring. When the temperature is kept low during dissolution a clear colorless solution results. A mixture of 3.9 cc. of nitric acid (sp. gr. 1.50) and 3.0 cc. of concentrated sulfuric acid is added drop-by-drop over a period of 30 minutes, while the temperature is kept below 5° C. The container is stoppered and set in a cool place for several hours or preferably over night. When the nitrated mixture is poured over 3-4 volumes of cracked ice the product separates immediately in pale yellow crystals. The crystals are filtered from the acid mixture, washed with cold water and recrystallized from hot water. The 2-nitro-4-arsono-phenoxyacetone crystallizes in long yellow needles melting at 190° C. Yield 80%.

Analysis: Subs., 0.2014, 0.2033; 25.25, 25.43 cc. N/10 bromate. Calculated for $C_9H_{10}O_7NAs$: As, 23.49%; found: As, 23.52, 23.55%.

*Example 4.—Preparation of corresponding arseno compounds*

Reduction of the oxyketone arsonic acids yields the corresponding arseno-compounds. For example, when a p-arsono-phenoxyacetone is dissolved in hot water, a slight excess of hypophosphorous acid added and the solution heated on the steam bath, there is formed first a turbid solution and soon thereafter the precipitation of a flocculent yellow precipitate, found to be the arseno compound, $$CH_3CO-CH_2-O-C_6H_4-As=$$
$$As-C_6H_4-O-CH_2COCH_3.$$

As would be expected from its structure, it is insoluble in aqueous alkali but it may be converted into soluble compounds due to the reactivity of the carbonyl groups.

*Example 5.—Preparation of corresponding arsenoxides*

The oxyketone arsonic acids may be reduced to the corresponding arsenoxides. Thus, for example, p-arsono-phenoxy-acetone yields the oxide $$CH_3CO-CH_2-O-C_6H_4-As=O.$$

6 grams of p-arsono-phenoxyacetone is added to 0.12 g. of potassium iodide, 1 cc. of 10% hydrochloric acid and 10 cc. of water, the container placed in an ice bath and sulfur dioxide gas passed into the mixture until it is saturated.

The reaction mixture is diluted slightly with water and concentrated ammonia water added drop-by-drop until the reaction is just alkaline to litmus. Following the addition of three grams of salt (sodium chloride) for each 10 cc. of water present and chilling, the crude oxide separates and is filtered off, washed with a little water, and dried. The yield is 4.2 g. (80% of theory).

The oxide is purified by twice precipitating it from a dilute alkaline solution with dilute hydrochloric acid and washing it free of chlorides. It is an amorphous white powder melting at approximately 206–209°. The analysis (31.3% and 30.8% arsenic found) agrees with the formula presented above.

The oxide may be utilized as such or it may be converted into water-soluble derivatives as, for example, the thio-arsinites. Thus, with thioglycollic acid it yields the compound $$CH_3CO-CH_2-O-C_6H_4-As=(SCH_2CO_2H)_2$$

which forms water-soluble alkali metal salts.

The examples given above are representative of various specific compounds falling within the class of compounds to which my invention is related. It is to be distinctly understood, however, that I have not given specifically all of the formulas of substances embraced by my invention but have merely shown that my invention is applicable to the preparation of a very large number of inter-related compounds, all of which have certain common characteristics.

What I claim as my invention is:

1. A compound comprising a benzene ring group joined to an arsenic group of the class including arsonic acids and their soluble salts, arseno compounds, arsenoxides, thio-arsenites and the water-soluble alkali metal salts thereof and joined in para position to a ketonic group through an ether linkage.

2. The compound designated by the formula

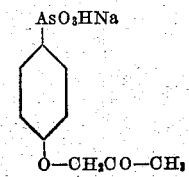

3. The process of preparing arsenicals useful as spirocheticides comprising the interaction in the presence of alkali of a para hydroxy-phenyl arsonic acid with a halogenoketone, thereby obtaining an aromatic arsonic compound containing an oxyketonic group.

4. A compound designated by the formula

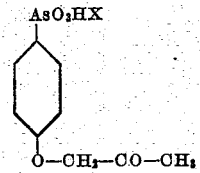

where X is a solubilizing group.

5. A compound designated by the formula

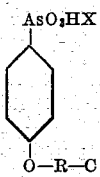

where R is alkylene, R' is a hydrocarbon radical of the class consisting of alkyl and aryl groups and X is a group of the class consisting of hydrogen and a solubilizing group.

6. A compound designated by the formula

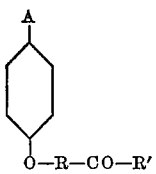

where R is alkylene, R' is a hydrocarbon radical of the class consisting of alkyl and aryl and A represents an arsenic group of the class including arsonic acids and their soluble salts, arseno compounds, arsenoxides, thio-arsenites and the water soluble alkali metal salts thereof.

7. A compound comprising a benzene ring group joined to an arsenic group of the class including arsonic acids and their soluble salts, arseno compounds, arsenoxides, thio-arsenites and the water-soluble alkali metal salts thereof, said benzene ring group being also joined to a group having the formula

where R is alkylene and R' is a hydrocarbon radical of the class consisting of alkyl and aryl.

8. A compound designated by the formula

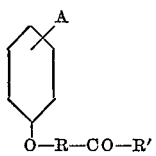

where R is alkylene, R' is alkyl and A represents an arsenic group of the class including arsonic acids and their soluble salts, arseno compounds, arsenoxides, thio-arsenites and the water-soluble alkali metal salts thereof.

9. A compound designated by the formula

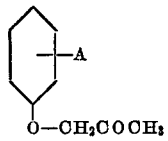

where A represents an arsenic group of the class including arsonic acids and their soluble salts, arseno compounds, arsenoxides, thio-arsenites and the water soluble alkali metal salts thereof.

10. A compound designated by the formula

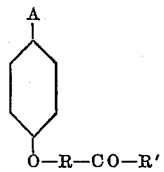

where R is alkylene, R' is alkyl and A represents an arsenic group of the class including arsonic acids and their soluble salts, arseno compounds, arsenoxides, thio-arsenites and the water soluble alkali metal salts thereof.

11. A compound designated by the formula

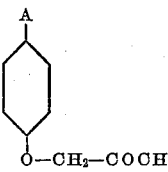

where A represents an arsenic group of the class including arsonic acids and their soluble salts, arseno compounds, arsenoxides, thio-arsenites and the water soluble alkali metal salts thereof.

CLIFF S. HAMILTON.